United States Patent Office 3,539,562
Patented Nov. 10, 1970

1

3,539,562
α - AMINO - 2,4,6 - CYCLOHEPTATRIENYLMETH-
YLCEPHALOSPORINS
Patrick Andrew Diassi, Westfield, Frank Lee Weisenborn, Somerset, and Jack Bernstein, New Brunswick, N.J., assignors to E. R. Squibb & Sons, Inc., New York, N.Y., a corporation of Delaware
No Drawing. Filed May 2, 1969, Ser. No. 822,859
Int. Cl. C07d 99/24
U.S. Cl. 260—243        7 Claims

ABSTRACT OF THE DISCLOSURE

This invention relates to α-amino-2,4,6-cycloheptatrienylmethylcephalosporins as well as their salts, which are useful as antibacterial agents.

SUMMARY OF THE INVENTION

This invention relates to α-amino-2,4,6-cycloheptatrienylmethylcephalosporins of the formula (I)
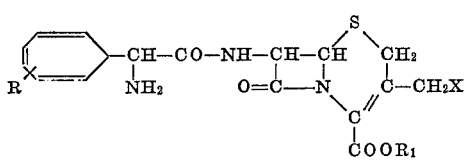

wherein R is hydrogen, halogen or lower alkyl, $R_1$ is hydrogen, lower alkyl or a salt forming ion, e.g., an alkali metal such as sodium or potassium, an alkaline earth metal such as calcium or magnesium or that of an organic base such as dibenzylamine, N,N'-dibenzylethylene diamine or the like; and X is hydrogen, lower alkanoyloxy, the radical of a nitrogen base such as methylamino, dimethylamino or the like, or a quaternary ammonium radical such as 1-pyridinium. In addition X and $R_1$ may represent a bond linking carbon and oxygen in a lactone ring. All four halogens are represented by the symbol R but chlorine and bromine are preferred. The lower alkyl groups represented by R and $R_1$ are straight and branched chain aliphatic hydrocarbon radicals of up to seven carbon atoms such as methyl, ethyl, propyl, isopropyl, butyl, isobutyl, t-butyl and the like. The lower alkanoyloxy groups represented by X are of the same type, e.g., acetoxy, propanoyloxy, and the like. Salts of the various compounds are also included.

DETAILED DESCRIPTION OF THE INVENTION

The new compounds of Formula I may be prepared by coupling an activated form of the amino-2,4,6-cycloheptatriene-acetic acid [2-(2,4,6-cycloheptatrien-1-yl)glycine] having the formula (II)
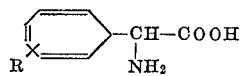

with a 7-aminocephalosporanic acid (7–ACA) moiety of formula (III)
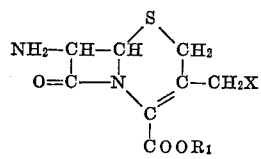

wherein X and $R_1$ have the same meaning as above. The amino group of the amino-2,4,6-cycloheptatriene-acetic acid is best protected before coupling for an efficient process.

2

Protecting groups which may be used to protect the amino group during the reaction of the acid compound with the 7–ACA compound include, for example, triphenylmethyl, t-butoxycarbonyl, β,β,β-trichloroethoxycarbonyl, 4-oxo-2-pentenyl-2, 1-carbomethoxy-1-propenyl-2 or the like. These are formed by reacting the acid of Formula II with a compound such as triphenylmethylchloride, t-butyl azidoformate, β,β,β-trichloroethyl chloroformate, acetylacetone, methylacetoacetate or the like. After the coupling reaction, the protecting group is removed, e.g., by treatment with aqueous acetic acid, trifluoroacetic acid, zinc-acetic acid or aqueous mineral acid, respectively to give the compound with the free amino group.

Alternately the amino group may be protected by protonation as the salt form before and during the subsequent coupling reaction.

The coupling is preferably effected by conversion of the acid to an activated form such as the acid chloride, azide, p-nitrophenyl ester or mixed anhydride, or by condensing in the presence of a carbodiimide such as dicyclohexylcarbodiimide.

The starting materials of Formula II may be prepared by the condensation of a tropylium tetrafluoroborate with dimethyl formamidomalonate or dimethylacetamidomalonate. In those cases in which a substituted tropylium tetrafluoroborate is used, the resultant product usually consists of a mixture of the 2,3- and 4-substituted 2,4,6-cycloheptatrien-1-yl derivatives. This mixture of isomers may be separated after this first reaction at any subsequent step in the synthesis or the mixture of isomers obtained in the final step may be used as such.

The malonate is hydrolyzed to the desired α-amino-2,4, 6 - cycloheptatriene-1-yl-acetic acid. Suitable tropylium tetrafluoroborates for this condensation include, among others, tropylium tetrafluoroborate, chlorotropylium tetrafluoroborate, bromotropylium tetrafluoroborate and methyltropylium tetrafluoroborate. Other tropylium tetrafluoroborates are readily prepared from the corresponding substituted tropilidenes, such as isopropyltropilidene, by a hydride exchange reaction with trityl salts in solvents such as acetonitrile or sulfur dioxide.

The products of this invention form salts which are also part of the invention. Basic salts form with the acid moiety as discussed above in connection with the symbol $R_1$. Acid addition salts also form with the α-amino nitrogen. Such acid salts include, for example, inorganic salts such as the hydrohalides, e.g., hydrobromide, hydrochloride, hydroiodide, sulfate, nitrate, phosphate, borate, etc., and organic salts such as acetate, oxalate, tartrate, malate, citrate, succinate, benzoate, ascorbate, methanesulfonate and the like. It is frequently convenient to isolate and purify the product by forming a soluble or insoluble salt, as desired, then regenerating the free compound, by neutralization, for example.

The preferred compound within the group described by Formula I is that in which R, $R_1$ and X are all hydrogen.

It will be appreciated that certain of the compounds of this invention exist in different optically active forms. The various stereoisomeric forms are within the scope of this invention.

The compounds of this invention have a broad spectrum of antibacterial activity against both gram positive and gram negative organisms such as Staphylococcus aureus, Salmonella schottmuelleri, Pseudomonas aeruginosa, Proteus vulgaris, Escherichia coli and Stereptococcus pyogenes. They may be used as antibacterial agents in a prophylactic manner, e.g., in cleaning or disinfecting compositions, or otherwise to combat infections due to organisms such as those named above, and in general may be utilized in a manner similar to other cephalosporins. For example, a compound of Formula I or a physiologically acceptable salt thereof may be used in various animal species in an amount of about 0.1 to 100 mg./kg./daily, orally or parenterally, in single or two to four divided doses to treat infections of bacterial origin. Up to about 600 mg. of a compound of Formula I or salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used.

The following examples are illustrative of the invention. All temperatures are on the centigrade scale.

Example 1

(a) Dimethyl α-formamido - 2,4,6 - cycloheptatriene-1-malonate.—A solution of 2.3 grams of sodium in 60 ml. of absolute ethanol is added dropwise and with stirring to a finely powdered mixture of 17.5 grams of dimethyl formamidomalonate and 17.8 grams of tropylium tetrafluoroborate. To this mixture there is then added 150 ml. of water and the solution is extracted with methylene chloride. The combined extracts are dried over anhydrous sodium sulfate and concentrated to yield a pale oil. This is dissolved in hot water, treated with decolorizing carbon, filtered and cooled to yield the crystalline product, melting at about 107–108°.

(b) N-formyl - 2 - (2,4,6 - cycloheptatrien-1-yl)glycine.—A solution of 2.65 grams of dimethyl α-formamido-2,4,6-cycloheptatriene-1-malonate in 60 ml. of methanol containing 8 grams of sodium hydroxide is allowed to stir overnight at room temperature. The mixture is concentrated to dryness under reduced pressure and the residue is dissolved in water, and treated with Dowex-50 (acid form) to adjust the pH to 5–5.5. The mixture is filtered and concentrated under reduced pressure to yield the desired product.

(c) 2 - (2,4,6 - cycloheptatrien - 1 - yl)glycine.—To a suspension of 3 grams of N-formyl-2-(2,4,6-cycloheptatriene-1-yl)glycine in 40 ml. of 3 N hydrochloric acid there is added 25 ml. of dimethyl formamide and 10 ml. of methanol. The mixture is heated until a solution is obtained and one ml. of concentrated hydrochloric acid is added. The reaction mixture is allowed to stir overnight at room temperature. The solvent is removed by the addition of n-butanol and concentration under reduced pressure. The residue is dissolved in water and absorbed on Dowex-50 (acid form) column. The column is then eluted with 2-N-ammonium hydroxide and the eluate concentrated under reduced pressure to yield the desired product. This may be purified by suspension in water-methanol and filtration, the insoluble material being the desired 2-(2,4,6-cycloheptatrien-1-yl)glycine.

(d) 2 - (N - t - butoxycarboxamido) - 2 - (2,4,6-cycloheptatrien-1-yl)acetic acid.—A mixture of 5.5 grams of 2(2,4,6-cycloheptatrien-1-yl)glycine and 2.66 grams of magnesium oxide is suspended in 400 ml. of 50% aqueous dioxane. After one-half hour stirring, 9.45 grams of t-butoxycarbonylazide are added. The reaction mixture is warmed to 50° and maintained at this temperature for 24 hours, during which time the stirring is continued.

The reaction mixture is poured into 200 ml. of ice and water and filtered. The filtrate is extracted with chloroform. The combined chloroform extracts are extracted with 5% aqueous sodium bicabonate solution and these extracts combined with the original aqueous solution. The solution is cooled to 5° and acidified to pH 3 by the addition of 3 N hydrochloric acid. The mixture is extracted with chloroform, the combined chloroform extracts dried over anhydrous sodium sulfate and concentrated. The residue is dissolved in hexane, filtered and allowed to evaporate at room temperature to yield the desired 2-(N-t-butoxycarboxamido) - 2 - (2,4,6 - cycloheptratriene-1-yl)acetic acid.

(e) 7 - [2 - amino - 2 - (2,4,6 - cycloheptatriene - 1-yl)acetamido]cephalosporanic acid.—A solution of 265 mg. of 2 - (N - t - butoxycarboxamido) - 2 - (2,4,6 - cycloheptatrien-1-yl)acetic acid and 102 mg. of triethylamine in 4.0 ml. of tetrahydrofuran is cooled to −10°, treated with 136 mg. of isobutyl chloroformate and stirred for 10 minutes at −10°.

To this solution there is added a cool solution of 272 mg. of 7-aminocephalosporanic acid and 101 mg. of triethylamine in 3.6 ml. of aqueous tetrahydrofuran (50%). The reaction mixture is stirred for 45 minutes at −5° to −10° and then allowed to warm to room temperature over a 15 minute interval. The solution is then diluted with 10 ml. of water. The aqueous solution is extracted with ethyl acetate and is then acidified to pH 3 in the presence of ethyl acetate. The acidified solution is extracted with ethyl acetate and the combined ethyl acetate extracts are dried over anhydrous sodium sulfate. The ethyl acetate solution is then concentrated under reduced pressure. The residue is dissolved in cold trifluoroacetic acid and stirred first at ice-bath temperature (3 minutes) and then at room temperature (5 minutes). The solution is concentrated under reduced pressure and the residue triturated with anhydrous ether to yield the desired product as the trifluoroacetic acid salt.

To a solution of 0.5 gram of the trifluoroacetic acid in 2 ml. of water is added 4 ml. of 25% Amberlite LA–1 (acetate form) in methyl isobutyl ketone. The mixture is stirred, with cooling, for one hour, the white solid is collected, washed with aqueous methyl isobutylketone and dried in vacuo to yield the desired 7-[2 - amino-2-(2,4,6-cycloheptatrien - 1 - yl)acetamido]cephalosporanic acid.

Example 2

7-[2-amino-2-(2,4,6-cycloheptatrien-1-yl)acetamido]-3-methyl-3-cephem-4-carboxylic acid.—Following the procedure of Example 1, but substituting an equivalent amount of 7-amino-3-methyl-3-cephem-4-carboxylic acid for the 7-aminocephalosporanic acid in part (e), there is obtained the desired 7-[2-amino-2-(2,4,6-cycloheptatrien-1-yl)acetamido]-3-methyl-3-cephem-4-carboxylic acid.

Example 3

7-[2-amino-2-(2,4,6-cycloheptatrien-1-yl)acetamido]-3-(1-pyridinium methyl)-3-cephem-4-carboxylate.—When a 0.1 molar solution of 7 - [2-amino-2-(2,4,6-cycloheptatrien-1-yl)acetamido]cephalosporanic acid is treated with 0.5 mole pyridinium acetate at pH-7 (the pH is adjusted to 7 with a few drops of aqueous pyridine solution) for several hours at room temperature, a rapid solvolysis occurs which can be followed by paper chromatography; when the disappearance of the starting material is complete, lyophilization provides good yields of the product as a fine, white powder.

Example 4

7-[2-amino-2-(2,4,6-cycloheptatrien-1-yl)acetamido]-3-deacetyl-cephalosporanic acid, lactone, hydrochloride.—A 0.1 molar solution of 7-[2-amino-2-(2,4,6-cycloheptatrien - 1 - yl)acetamido]cephalosporanic acid is acidified with dilute hydrochloric acid to pH 1–3 and maintained at that point until paper chromatography shows absence of starting material; lyophilization gives the product as a powder which may be further purified by crystallization from aqueous ethanol or acetonitrile.

Example 5

7 - [2-amino-2-(2,4,6-cycloheptatrien-1-yl)acetamido] cephalosporanic acid, sodium salt.—A solution of 418 mg. of 7-[2-amino-2-(2,4,6-cycloheptatrien - 1 - yl)acetamido]cephalosporanic acid in 10 ml. of 0.10 N aqueous sodium hydroxide is lyophylized to produce the desired salt as an amorphous white solid.

Example 6

7 - [2 - amino - 2-(4-methyl-2,4,6-cycloheptatrien-1-yl)acetamido]-cephalosporanic acid.—Following the procedure of Example 1, but substituting an equivalent amount of methyltropylium tetrafluoroborate for the tropylium tetrafluoroborate in part (a), there is obtained the desired 7-[2-amino-2-(4-methyl-2,4,6-cycloheptatrien-1-yl)-acetamido]cephalosporanic acid.

Example 7

7-[2 - amino - 2 - (3-chloro-2,4,6-cycloheptatrien-1-yl)acetamido]-cephalosporanic acid.—Following the procedure of Example 1 but substituting an equivalent amount of chlorotropylium tetrafluoroborate for the tropylium tetrafluoroborate in part (a), there is obtained the desired 7 - [2 - amino - 2 - (3-chloro-2,4,6-cycloheptatrien-1-yl)acetamido]cephalosporanic acid.

Example 8

7 - [2 - amino - 2-(4-bromo-2,4,6-cycloheptatrien-1-yl)acetamido]-cephalosporanic acid.—Following the procedure of Example 1, but substituting an equivalent amount of bromotropylium tetrafluoroborate for the tropylium tetrafluoroborate in part (a), there is obtained the desired 7-[2 - amino-2-(4-bromo-2,4,6-cycloheptatrien-1-yl)-acetamido]cephalosporanic acid.

Example 9

7 - [2 - amino - 2-(4-methyl-2,4,6-cycloheptatrien-1-yl)acetamido] - 3 - methyl-3-cephem-4-carboxylic acid.—Following the procedure of Example 1, but substituting an equivalent amount of methyltropylium tetrafluoroborate for the tropylium tetrafluoroborate in part (a), and an equivalent amount of 7-amino-3-methyl-3-cephem-4-carboxylic acid for the 7-aminocephalosporanic acid in part (e), there is obtained the desired 7-[2-amino-2-(4-methyl-2,4,6-cycloheptatriene-1-yl)acetamido] - 3 - cephem - 4-carboxylic acid.

Example 10

7-[2-amino-2-(2,4,6-cycloheptatrien-1-yl)acetamido]-3-methyl-3-cephem-4-carboxylic acid, sodium salt.—A solution of 360 mg. of 7-[2-amino-2-(2,4,6-cycloheptatrien-1-yl)acetamido]-3-methyl-3-cephem-4-carboxylic acid in 10 ml. of 0.10 N aqueous sodium hydroxide is lyophilized to yield the desired 7-[2-amino-2-(2,4,6-cycloheptatrien-1-yl)acetamido]-3-3methyl-3-cephem-4-carboxylic acid, sodium salt as a white amorphous powder.

What is claimed is:

1. A compound of the formula

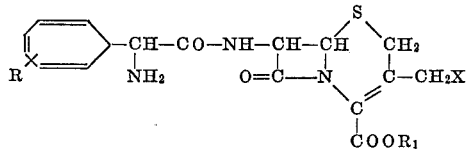

wherein R is hydrogen, halogen or lower alkyl, $R_1$ is hydrogen, lower alkyl or a salt forming ion of an alkali metal, alkaline earth metal or the organic nitrogen bases dibenzylamine or N,N'-dibenzylethylene diamine, and X is hydrogen, lower alkanoyl, or the radicals methylamino, dimethylamino or 1-pyridinium or X and $R_1$ is a bond linking carbon and oxygen in a lactone ring, and acid addition salts thereof.

2. A compound of claim 1, wherein R and $R_1$ each is hydrogen and X is acetoxy.

3. A compound of claim 1, wherein R, $R_1$ and X is each hydrogen.

4. A compound of claim 1, wherein R is methyl, $R_1$ is hydrogen and X is acetoxy.

5. A compound of claim 1, wherein R and X each is methyl and $R_1$ is hydrogen.

6. 7-[2-amino-2-(2,4,6 - cycloheptatrien - 1 - yl)acetamido]-3-(1-pyridiniummethyl)-3-cephem-4-carboxylate.

7. 7 - [2 - amino - 2-(2,4,6-cycloheptatrien-1-yl)acetamido]-3-desacetylcephalosporanic acid, lactone.

References Cited
UNITED STATES PATENTS 2,985,648   5/1961   Doyle et al. ——————— 260—239.1
3,222,362   12/1965   Flynn ————————————— 260—243

NICHOLAS S. RIZZO, Primary Examiner

U.S. Cl. X.R.

424—246